B. Boardman,
Blind Slat Staple.

Reisssue No. 2,183. Reissued Mar. 30, 1858.

UNITED STATES PATENT OFFICE.

BYRON BOARDMAN, OF NORWICH, CONNECTICUT.

IMPROVED WIRE STAPLE.

Specification forming part of Letters Patent No. 19,747, dated March 30, 1858; Reissue No. 2,183, dated March 6, 1866.

*To all whom it may concern:*

Be it known that I, BYRON BOARDMAN, of Norwich, in the county of New London and State of Connecticut, have invented a new and improved wire staple for connecting blind-slats to the rods which guide and govern their positions, and for which staples I desire to obtain a patent as for a new manufacture. The following is a clear and exact description of the form of said staples and of their mode of construction, which will be more fully understood by reference to the accompanying drawings, which illustrate and form a part of this specification.

The nature of my invention consists in the production of a vendible article of a new and highly convenient and useful shape. I propose to form the staples by which the slats of window blinds are attached to the rods which move and control them of such a shape that, while they can readily be inserted into the wood they cannot easily be withdrawn, and in such a shape, also, that they can be readily and rapidly made by machinery, so that they can be produced in great quantities, and kept for sale in the market as an article of merchandise.

Figure 2:
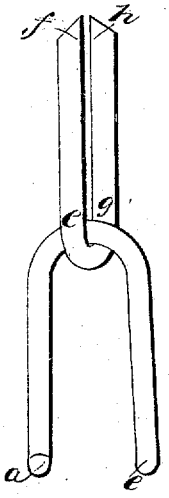

In the drawings, *a b c d* represent an enlarged plan view of the proposed staples, and *e f g h* an edge view thereof. Fig. 2 represents the same staples after being bent into shape and before being serrated with indentations, as hereinafter explained.

Figure 1:
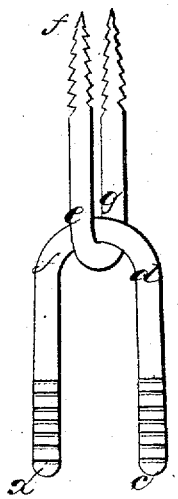

I prefer beveling the points as therein shown in order to produce sharper points, to facilitate their insertion into the wood. They should ordinarily be from three to five eighths of an inch in length, with an opening between the two branches of about three-sixteenths of an inch. I usually make them of wire of No. 18 to 20 wire-gage. These staples, after being prepared as shown in Fig. 2, are subjected to the action of dies with serrated ridges, to produce corresponding indentations in the staples, and so shaped and arranged as to press harder or come nearer in contact as they approach the points *a c* than at a distance therefrom. By this means the impressions are deeper toward the piercing-point, and the wire is spread and made to taper in thickness toward that point. The pressure of the dies, acting at or near the extreme point, causes the bended extremities *f h*, Fig. 2, to assume a central position, as shown at *f h*, Fig. 1, and the same action will also give a rounded edge in the other direction, as shown at *a c*, and in this condition the staple is completed and ready for use. The transverse indentations should slant or be beveled in such directions as will favor their being driven into the wood or other substance in which they are driven and prevent them from being easily withdrawn. I generally make the indentations square across the wire, as shown in the drawings; but this is not indispensable, as they may be made to form an acute or obtuse angle with the wire without essentially impairing their general utility.

Some of the advantages over the ordinary staples formerly in use, which are secured by thus pointing and swaging them with transverse grooves, as herein described, are: First, they may be made shorter than the ordinary staples, which are not clinched, and hence, will allow of a much smaller rod, as they will sustain from three to four times as much strain without being drawn out; second, they will also dispense with the necessity of being clinched, and will hold in the rod equally as well as that variety called the "fish-back" staple, while the rod is not bruised or defaced, as is the case when the staple is clinched; third, they will hold as well in the slat when clinching is impracticable as in the rod, and will not be liable to be drawn out by turning the slats; finally, they may be driven without previously piercing the rod or slat, as the peculiar form of the points enables them to part the grain of the wood and enter without breaking the fiber, which, as the staple is driven, closes into their indentations and holds the staples firmly embedded in the wood.

It is easy to contrive machinery that shall accomplish the purposes above mentioned without the exercise of any inventive ingenuity; and, as I make no claim to any such machinery, it has not been thought necessary to describe the construction or operation of any such machinery.

I am aware that Ballard's patent of 1841 shows a spike constructed with transverse corrugations made substantially like those proposed by me, so that, while it will penetrate wood without much increased resistance, it cannot be withdrawn without great difficulty. I do not lay claim to the discovery of any new principle, nor do I seek to patent such principle; but What I do claim as new, and desire to secure by Letters Patent as a new manufacture or commodity, is—

A wire staple adapted for use in making window blinds or screens and constructed substantially as above described.

BYRON BOARDMAN.

Witnesses:

JAMES BOARDMAN,

ELISHA P. SLOCUM.